United States Patent
Wright (10) Patent No.: US 10,742,094 B1
(45) Date of Patent: Aug. 11, 2020

(54) TEMPERATURE MONITORING OF MAGNETS IN PERMANENT MAGNET MOTORS USED IN VEHICLE DRIVETRAINS

(71) Applicant: Wrightspeed, Inc., Alameda, CA (US)

(72) Inventor: Ian Wright, Alameda, CA (US)

(73) Assignee: Wrightspeed, Inc., Alameda, CA (US)

( * ) Notice: Subject to any disclaimer, the term of this patent is extended or adjusted under 35 U.S.C. 154(b) by 317 days.

(21) Appl. No.: 15/887,811

(22) Filed: Feb. 2, 2018

Related U.S. Application Data (60) Provisional application No. 62/454,081, filed on Feb. 3, 2017.

(51) Int. Cl.
| | | |
|---|---|---|
| *H02K 11/25* | (2016.01) | |
| *B60L 15/20* | (2006.01) | |
| *H02K 1/27* | (2006.01) | |
| *B60L 50/50* | (2019.01) | |

(52) U.S. Cl.
CPC ............. *H02K 11/25* (2016.01); *B60L 15/20* (2013.01); *B60L 50/50* (2019.02); *H02K 1/27* (2013.01)

(58) Field of Classification Search
CPC ................................ H02K 11/25; B60L 50/50
USPC ................ 318/801, 800, 799, 798, 767, 727
See application file for complete search history.

(56) References Cited

U.S. PATENT DOCUMENTS

| | | | | |
|---|---|---|---|---|
| 7,319,300 B2* | 1/2008 | Hahn | ........................ | H02P 6/28 318/400.08 |
| 8,547,045 B2* | 10/2013 | Wu | ......................... | H02P 7/285 318/432 |
| 9,030,143 B2* | 5/2015 | Guzelgunler | ........... | H02P 29/02 318/461 |
| 9,628,017 B2* | 4/2017 | Ogawa | ...................... | B60L 3/12 |

* cited by examiner

*Primary Examiner* — David Luo
(74) *Attorney, Agent, or Firm* — Kwan & Olynick LLP (57) ABSTRACT

Provided are methods for monitoring temperatures of permanent magnets disposed on rotors of permanent magnet motors. Also provided are vehicle drivetrains including permanent magnet motors and controllers operable to monitor temperatures of permanent magnets used in these motors. A magnet temperature is determined based on the rotational speed of the motor and also based on the open circuit voltage of the motor at this rotational speed. The motor may be specifically calibrated to determine its response to magnet temperature changes for any rotational speed. During operation, an inverter connected to the motor and controlling motor's operation may pause its switching for a period of time and check the open circuit voltage of the motor during this period. The corresponding rotor speed may be obtained from other sensors. The controller uses this information to determine the magnet temperature and, in some embodiments, to perform various control operations to avoid overheating.

20 Claims, 4 Drawing Sheets

TEMPERATURE MONITORING OF MAGNETS IN PERMANENT MAGNET MOTORS USED IN VEHICLE DRIVETRAINS

CROSS-REFERENCE TO RELATED APPLICATIONS

This application claims the benefit under 35 U.S.C. § 119(e) of U.S. Provisional Patent Application 62/454,081, entitled: "Temperature Monitoring of Magnets in Permanent Magnet Motors Used in Vehicle Drivetrains" filed on Feb. 3, 2017, which is incorporated herein by reference in its entirety.

BACKGROUND

Recent advancements of magnet materials, such as neodymium magnets, brought additional interest in permanent magnet motors. In comparison to other types of electrical motors, permanent magnet motors have high power densities achieved, in part, by eliminating excitation losses. Furthermore, permanent magnet motors have high torque-to-inertia ratios and high efficiencies making these motors particularly suitable for drivetrains of electrical vehicles. Unfortunately, many permanent magnets are sensitive to heating and may experience significant demagnetization as the temperature of these magnets is increased. At low temperatures, the demagnetization may be still reversible leading to torque losses. At higher temperatures, demagnetization may be permanent often requirement motor replacement. Yet, precise measurement of magnet temperatures is difficult and not possible in some applications. For example, rotors are enclosed in motor housings and surrounded by other components. Furthermore, some orientations of the magnets on a rotor may complicate this temperature measurement. Finally, rotor temperatures can change quickly when permanent magnet motors operate due to electrical and mechanical losses further complicating the temperature monitoring and control.

SUMMARY

Provided are methods for monitoring temperatures of permanent magnets disposed on rotors of permanent magnet motors. Also provided are vehicle drivetrains including permanent magnet motors and controllers operable to monitor temperatures of permanent magnets used in these motors. A magnet temperature is determined based on the rotational speed of the motor and also based on the open circuit voltage of the motor at this rotational speed. The motor may be specifically calibrated to determine its response to magnet temperature changes for any rotational speed. During operation, an inverter connected to the motor and controlling motor's operation may pause its switching for a period of time and check the open circuit voltage of the motor during this period. The corresponding rotor speed may be obtained from other sensors. The controller uses this information to determine the magnet temperature and, in some embodiments, to perform various control operations to avoid overheating.

In some embodiments, a method comprises determining the open circuit voltage of the permanent magnet motor, determining the rotational speed of the rotor of the permanent magnet motor, and determining the magnet temperature of magnets on the rotor based on the open circuit voltage and also based the rotational speed. The open circuit voltage is determined while the rotor rotates and corresponds to the rotational speed used to determine the magnet temperature.

Determining the open circuit voltage and, as a result, determining the magnet temperature may be performed while the vehicle is in motion. For example, the permanent magnet motor may be mechanically coupled to the wheel of the vehicle in motion. The permanent magnet motor may be coupled to the wheel directly or using a transmission, which may be in a driving gear during determining the open circuit voltage and the rotational speed. In this example, the rotational speed of the wheel (and the linear speed of the vehicle) may correspond to the rotational speed of the rotor (accounting for any gearing). Alternatively, the permanent magnet motor may be mechanically decoupled to the wheel (e.g., the transmission may be in a neutral gear) while determining the open circuit voltage.

In some embodiments, the method further comprises operating the vehicle using the permanent magnet motor. For example, the power may be supplied to the permanent magnet motor or generated by the permanent magnet motor during operations of the vehicle. Some examples of these operations involving the permanent magnet motor include, but are not limited to, accelerating the vehicle using the permanent magnet motor, decelerating the vehicle using the permanent magnet motor, and maintaining a constant speed of the vehicle using the permanent magnet motor. These operations may be changed while determining the open circuit voltage of the permanent magnet motor. For example, no power may be generated by the motor or supplied to the motor while determining the open circuit voltage. The vehicle operation may change (interrupted) for short period of time to determine the open circuit voltage. In some embodiments, determining the open circuit voltage comprises pausing transistor switching in an inverter connected to the permanent magnet motor and used to power the motor. For example, the transistor switching may be paused for less than 100 milliseconds. This time frame is generally sufficient for determining the open circuit voltage.

In some embodiments, determining the rotational speed is performed simultaneously with determining the open circuit voltage. However, if the rotational speed is relatively constant, these operations may be decoupled. For example, the rotational speed may be estimated from a range of values around the period during which the open circuit voltage is determined. It should be noted that determining the open circuit voltage may take a very brief period of time, such as milliseconds. The mechanical inertia associated with the motor will simply prevent significant speed changes during such short periods of time.

Determining the rotational speed may be performed by a speed sensor coupled to a wheel, a gear box, or the permanent magnet motor. For example, the vehicle speedometer and the current gear may be used to determine the rotational speed of the rotor. Other methods of determining the rotational speed are also within the scope.

In some embodiments, determining the temperature of the permanent magnet motor is performed from calibration data for the permanent magnet motor. The calibration data may comprise at least a calibration temperature, a calibration speed, and a calibration voltage corresponding to the calibration temperature and the calibration speed. In these embodiments, determining the magnet temperature may comprises determining a test voltage corresponding to the rotational speed and then determining the magnet temperature corresponding to the open circuit voltage (and also to the rotation speed). Specifically, determining the test voltage is based on the calibration voltage and the difference between the calibration speed and the rotational speed. Determining the magnet temperature may be based on the calibration temperature and a difference between the test voltage and the open circuit voltage. Furthermore, in these embodiments, the method may comprise calibrating the permanent magnet motor at the calibration temperature and the calibration speed to determine the calibration voltage. The calibration of the permanent magnet motor may be performed prior to integrating the permanent magnet motor into the drivetrain.

In some embodiments, a set of operations comprising determining the open circuit voltage, determining the rotational speed, and determining the magnet temperature is repeated while the vehicle is in motion. For example, these operations may be repeated at a set frequency. Alternatively, the frequency of determining the temperature may depend on the previously determined magnet temperature and, for example, its proximity to a maximum magnet temperature threshold. This threshold may be selected to avoid irreversible demagnetization. In some embodiments, the set of operations is repeated after a time period selected from the group consisting of a preset time period, a time period determined based on the previously determined temperature, and a time period determined based on the electrical load (current and/or prior) of the permanent magnet motor.

In some embodiments, the method further comprises performing at least one controlling operation selected from the group consisting of: (1) controlling the rotational speed of the permanent magnet motor, (2) controlling the torque output of the permanent magnet motor, and (3) controlling cooling of the of the permanent magnet motor. This controlling operation may be performed based on the determined magnet temperature. For example, as the determined temperature approaches the maximum threshold, the temperature controlling operation may be selected and implemented.

Also provided is a vehicle drivetrain comprising a permanent magnet motor, an inverter, a speed sensor, and a controller. The permanent magnet motor comprises a rotor having permanent magnets. The inverter is electrically coupled to the permanent magnet motor and controls electrical power applied to or received from the permanent magnet motor. Furthermore, the inverter is operable to determine an open circuit voltage of the permanent magnet motor. The sensor is operable to determine the rotational speed of the rotor of the permanent magnet motor. Finally, the controller is communicatively coupled to the inverter and to the speed sensor. The controller is operable to determine the magnet temperature of the permanent magnet motors from the open circuit voltage and the rotational speed. Furthermore, the controller may be operable to perform various operations of the method described above. In some embodiments, the vehicle drivetrain further comprises a cooling system thermally coupled to the permanent magnet motor and controlled by the controller.

In some embodiments, the controller of the vehicle drivetrain comprises calibration data for the permanent magnet motor. The calibration data may comprise at least a calibration temperature, a calibration speed, and a calibration voltage corresponding to the calibration temperature and the calibration speed.

The inverter may comprise one or more transistors controlled by the controller while determining the open circuit voltage. In some embodiments, the vehicle drivetrain further comprises a power source electrically coupled to the inverter. The inverter is operable to control power supplied by the power source to the permanent magnet motor while determining the open circuit voltage.

These and other embodiments are described further below with reference to the figures.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Permanent magnet motors have many superior characteristics in comparison to other types of motors and, as a result, are being considered and adopted for automotive (e.g., electrical drivetrains) and other applications. For purposes of this disclosure, a permanent magnet motor is defined as a motor comprising an electrical winding on its stator and permanent magnets on its rotor. The permanent magnet motor has no excitation losses unlike, for example, a field wound motor, which results in a higher operating efficiency. Furthermore, permanent magnet motors generally have higher torque, higher output power per volume (since no stator power needed for magnetic field production), better dynamic performance, and higher magnetic flux density than other types of motors (e.g., motors operating with electromagnetic excitation). Larger air-gaps used in permanent magnet motors also make these motors more reliable. Finally, permanent magnet motors tend to have simpler construction design and much easier for maintenance.

Figure 1A:
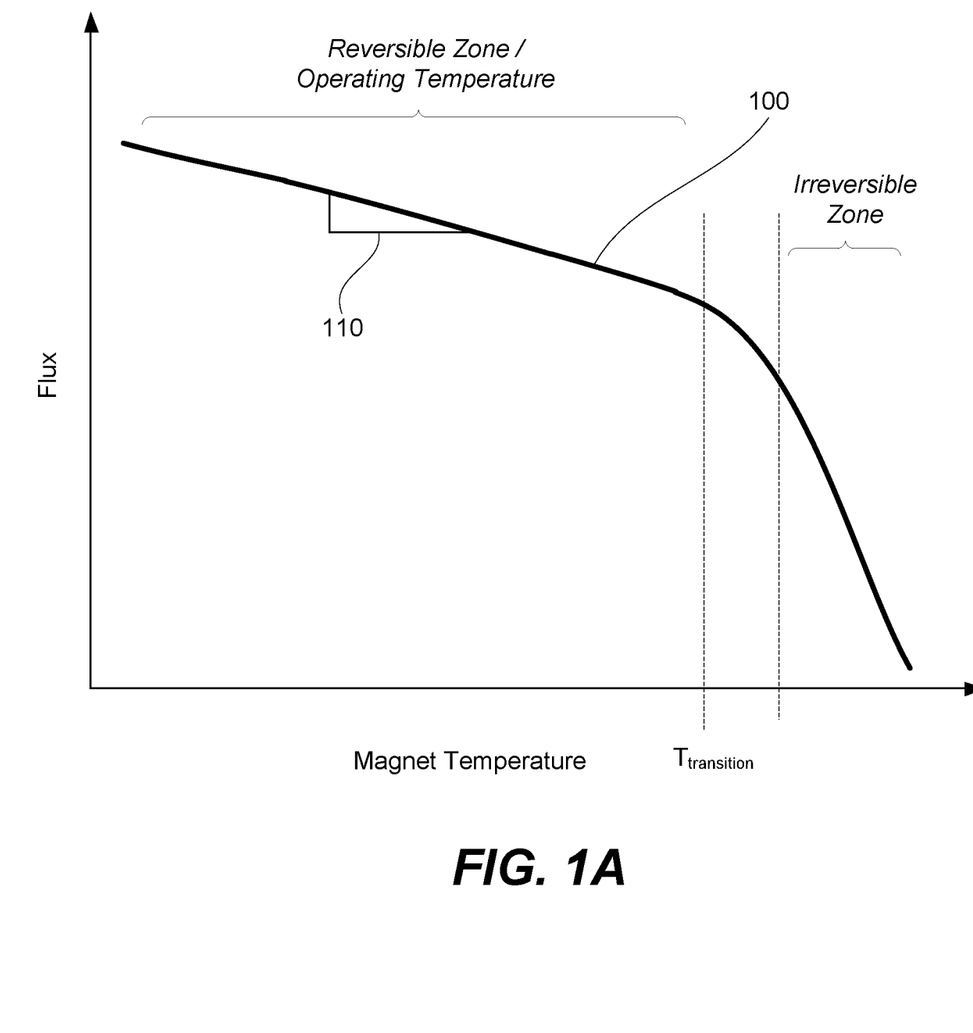
FIG. 1A is a schematic plot of a magnetic flux as a function of the magnet temperature in a permanent magnet motor, in accordance with some embodiments.

However, permanent magnet motors or, more specifically, permanent magnets used on rotors of these motors van be very heat sensitive. Specifically, both remanence and coercivity of a permanent magnet may rapidly decrease with an increase in temperature resulting in demagnetization of the magnet. Initial demagnetization may be reversible, which may be acceptable to some degree. It should be noted that the reversible demagnetization is not generally undesirable as it leads to reduced performance characteristics of the motor, such as a lower torque. However, further increase in temperature may lead to permanent demagnetization as schematically shown in FIG. 1A. Specifically, FIG. 1A is a schematic plot of magnetic flux 100 as a function of the magnet rotor temperature. A transition temperature between the reversible zone and reversible zone may the maximum service temperature. This temperature is different for different materials used for permanent magnets as further described below.

It should be noted that in addition to permanent magnets being sensitive to heating, permanent magnet motors and operating environments of these motors may be susceptible to heating. For example, heating of permanent magnets may be caused by electromagnetic losses, such as copper losses (e.g., resistive and eddy current losses) and iron losses (e.g., hysteresis, eddy current, and excess losses), and to some extent mechanical losses (e.g., frictional losses in bearings, couplings and air) in the motors. Iron losses in permanent magnet motors may form a larger portion of the total losses than, for example, in the induction motors. Higher operating power densities of permanent magnet motors, typical for automotive applications (e.g., car acceleration), result in more heat generated. Furthermore, the magnets have poor heat dissipation, which exacerbates the cooling issue. Finally, electrical motors used in automotive applications are often exposed to high ambient temperatures with limited cooling options.

Figure 1B:
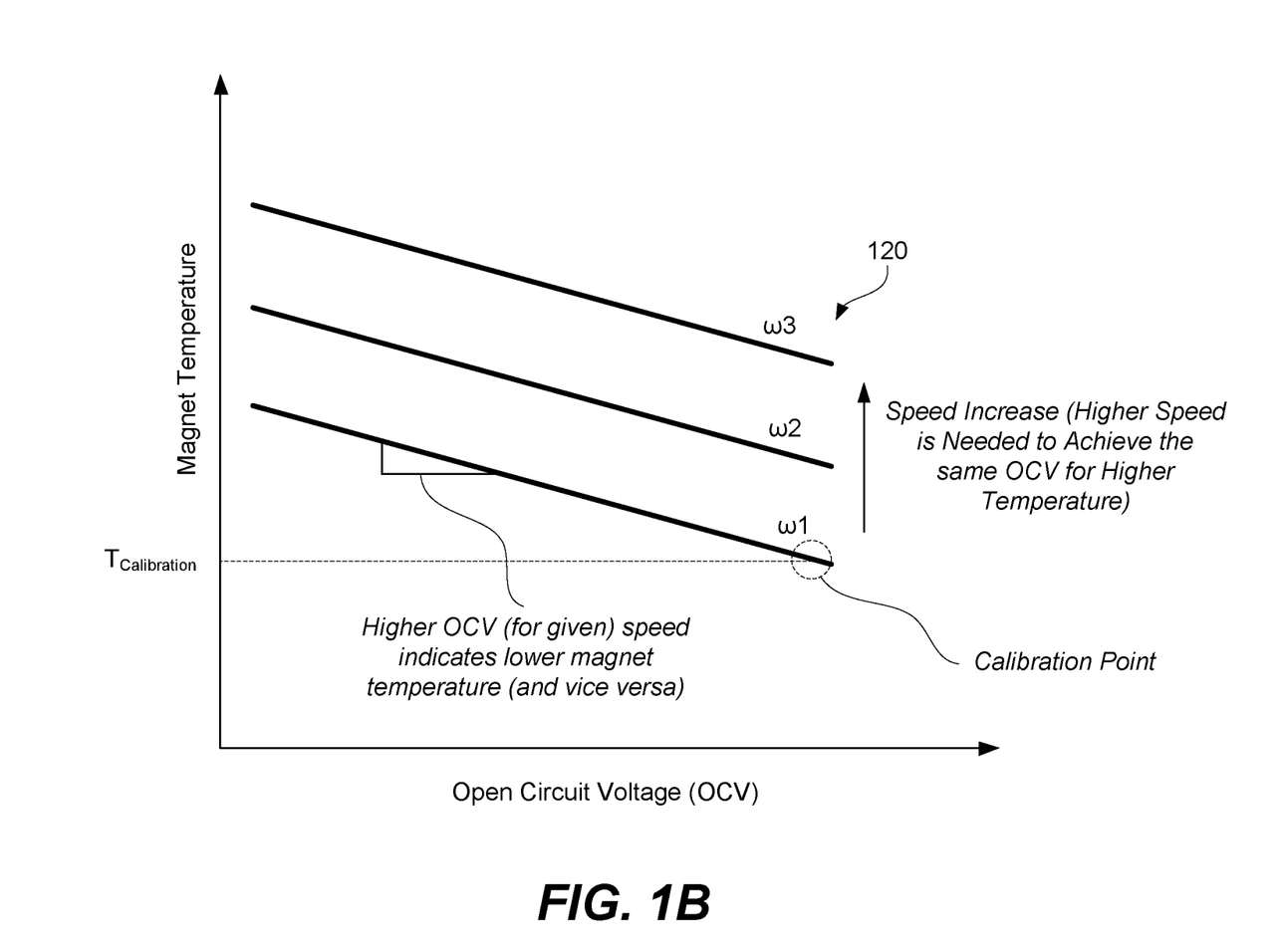
FIG. 1B is a schematic representation of one example of calibration data used for determining the magnet temperature of a permanent magnet motor, in accordance with some embodiments.

Returning to FIG. 1A, permanent magnets typically have constant slope 110 of magnetic flux 100 (as a function of the temperature) in the reversible zone. This flux-temperature slope may be utilized to determine the magnet temperature. Specifically, the difference in magnetic flux may be estimated based on changes in the open circuit voltage (for a set speed). As such, as permanent magnets heat up, the open circuit voltage decreases and, in some cases, this decrease is linear. Furthermore, the open circuit voltage is proportional to the rotor speed. As such, knowing one open circuit voltage for a particular magnet temperature and at a particular rotor speed (which may be referred to as calibration data), one can use this information to find any magnet temperatures (in the reversible operating region) from a particular open circuit voltage at a particular speed. One having ordinary skill in the art that this calibration data may be organized and used in a variety of different ways. For example, the calibration data may comprise at least a calibration temperature, a calibration speed, and a calibration voltage corresponding to the calibration temperature and the calibration speed. As such, the calibration data may be a single data point. All other operating regimes may be extrapolated from this point based on the open circuit voltage being proportional to the rotor speed and also being proportional to the magnet temperature. This extrapolation may be presented as a set of graphs as, for example, schematically should in FIG. 1B, database, or some other form. Specifically, FIG. 1B illustrates an example of calibration data 120. Specifically, once an open circuit voltage and a rotational speed of the rotor of the permanent magnet motor is determined, the magnet temperature corresponding to this voltage and speed may be determined using calibration data and one or more equations, graphs, or databases (e.g., a lookup table). The determined magnet temperature may be then used to prevent overheating of the permanent magnets as further described below.

Drivetrain Examples

Figure 2:
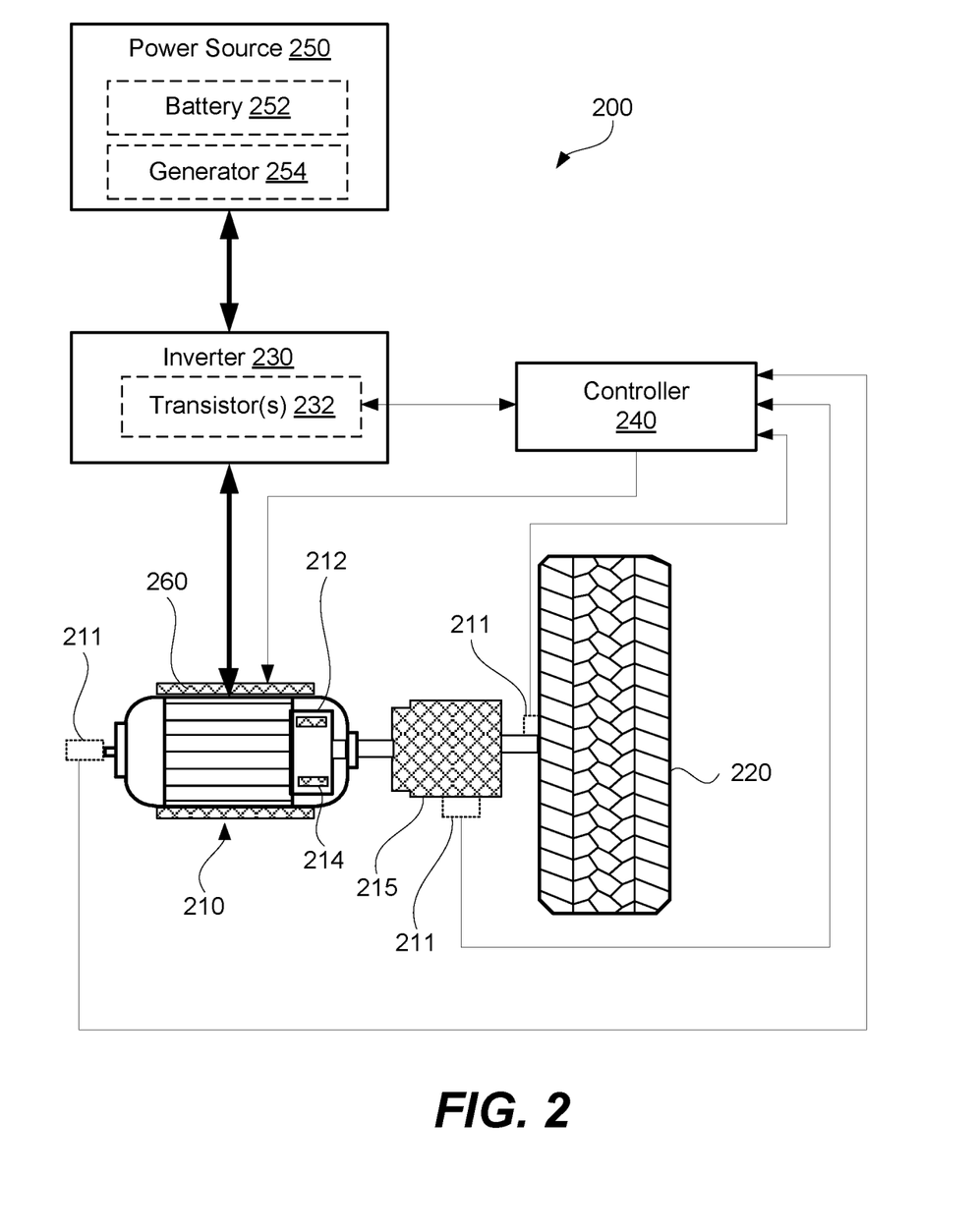
FIG. 2 is a schematic representation of a vehicle drivetrain comprising a permanent magnet motor and a controller for monitoring the magnet temperature of the permanent magnet motor, in accordance with some embodiments.

FIG. 2 is a schematic representation of vehicle drivetrain 200, in which the magnet temperature is monitored, in accordance with some embodiments. Main components of vehicle drivetrain 200 include permanent magnet motor 210, inverter 230, and controller 240. One example of permanent magnet motor 210 is a synchronous motor or, more specifically, an interior permanent magnet synchronous motor (IPMSM). The synchronous motors have an excellent power density and efficiency, making it particularly suitable for vehicle drivetrain applications. These motors operate at a constant speed in absolute synchronism with the line frequency (e.g., being sinusoidally excited or trapezoidaly excited/square wave), which makes their speed control relatively straight forward.

Permanent magnet motor 210 comprises rotor 212. In synchronous permanent magnet motor 210, rotor 212 rotates synchronously with the rotating magnetic field produced by the electrical winding powered by inverter 230. Inverter 230 may be operable as a poly-phase electric supply. This is achieved by switching transistors of inverter 230 at a frequency defining the rotational speed of rotor 212.

Rotor 212 comprises permanent magnets 214. The position of permanent magnets 214 defines the type of rotor 212. Some examples of rotor 212 include a surface magnet rotor, an interior magnet rotor, an inset magnet rotor, and a rotor with buried magnets symmetrically and asymmetrically distributed. Permanent magnets 214 may be made from alnico magnets (e.g., iron alloys including aluminum, nickel, and cobalt), ferrite magnets (e.g., barium ferrite BaO×6 $Fe_2O_3$, strontium ferrite SrO×6 $Fe_2O_3$) samarium-cobalt (SmCo) magnets, neodymium iron boron magnets ($Nd_2Fe_{14}B$, often abbreviated as NdFeB and referred to as neodymium magnets), or some other suitable materials. Each of these magnet materials will now be described in more detail.

Alnico magnets have a high magnetic remanent flux density and low temperature coefficient. The maximum service temperature of these magnets may be as high as 520° C. However, these magnets also have very low coercive forces resulting in magnets being able to easily magnetize and demagnetize.

Ferrite magnets have higher coercive forces than Alnico magnets and a lower remanent magnetic flux density. Furthermore, ferrite magnets have relatively high temperature coefficients. The maximum service temperature is about 400° C.

Samarium-cobalt magnets have a high remanent magnetic flux density, a high coercive force, a linear demagnetization curve, and a low temperature coefficient. The maximum service temperature of the magnets is of 300° C. to 350° C.

Finally, neodymium magnets have the highest magnetic properties of all magnet materials at least at the room temperature. However, the maximum service temperature of neodymium magnets is only 250° C. (with the Curie temperature being 350° C.). The demagnetization curves, especially the coercive force, of these magnets are strongly temperature dependent for these magnets.

Inverter 230 is electrically coupled to permanent magnet motor 210 and controls electrical power applied to permanent magnet motor 210 and, in some embodiments, received from permanent magnet motor 210 (e.g., when permanent magnet motor 210 is operated in a regenerative mode). Inverter 230 may include one or more transistors 232. Inverter 230 and its transistors 232 are controlled by controller 240, for example, when determining the open circuit voltage of permanent magnet motor 210 as further described below. For example, switching of transistors 232 may be paused for a period of time while determining the open circuit voltage.

In some embodiments, vehicle drivetrain 200 may receive rotational speed information from other components of the vehicle, such as a speedometer. Alternatively, vehicle drivetrain 200 may include sensor 211 for determining the rotational speed of rotor 212 of permanent magnet motor 210. As shown in FIG. 2, this sensor 211 may be position on permanent magnet motor 210 itself, on wheel 220 coupled to permanent magnet motor 210, and gearbox 215 that, in some embodiments, couples wheel 220 and permanent magnet motor 210. Depending on the position of this sensor, various other factors may be taken into an account when determining the rotational speed of rotor 212, such as the current gear selection of gearbox 215 and/or gearing (e.g., a differential) that may be present in vehicle drivetrain 200 between rotor 212 and the sensor.

Controller 240 is communicatively coupled to inverter 230 and to sensor 211. Specifically, this communicative coupling supplies the rotational speed information and the open circuit voltage information to controller 240 while monitoring the magnet temperature. Furthermore, this communicative coupling may be used to control operation of inverter 230, e.g., stop switching transistors while determining the open circuit voltage of permanent magnet motor 210. Controller 240 is operable to determine the magnet temperature from the open circuit voltage and the rotational speed using, for example, the calibration data available in controller 240. The calibration data may comprise a set of calibration open circuit voltages each corresponding to a different calibration rotational speed for a calibration temperature.

In some embodiments, vehicle drivetrain 200 further comprises cooling system 260 thermally coupled to permanent magnet motor 210. Cooling system 260 may be controlled by controller 240. For example, controller 240 may activate cooling system 260 when the temperature of rotor 212 of permanent magnet motor 210 exceeds a cooling activation threshold. For rotor 212 made from NdFeB magnets, the cooling activation threshold may be between about 100° C. and 250° C. or, more specifically, between 150° C. and 200° C. Cooling system 260 may include a cooling jacket positioned over permanent magnet motor 210 with a heat transfer fluid circulating through this cooling jacket. In some embodiments, cooling system 260 of vehicle drivetrain 200 is integrated with other like system of the vehicle. For example, cooling system 260 of vehicle drivetrain 200 may integrated with a heating system of the vehicle, a cooling system of a range extender, and the like.

In some embodiments, vehicle drivetrain 200 further comprises power source 250 electrically coupled to inverter 230. Power source 250 may include battery 252 and/or generator 254. For example, generator 254 may be a part of a range extender or some other system. Inverter 230 is operable to control power supplied by power source 250 to permanent magnet motor 210 while determining the open circuit voltage.

Temperature Monitoring Examples

Figure 3:
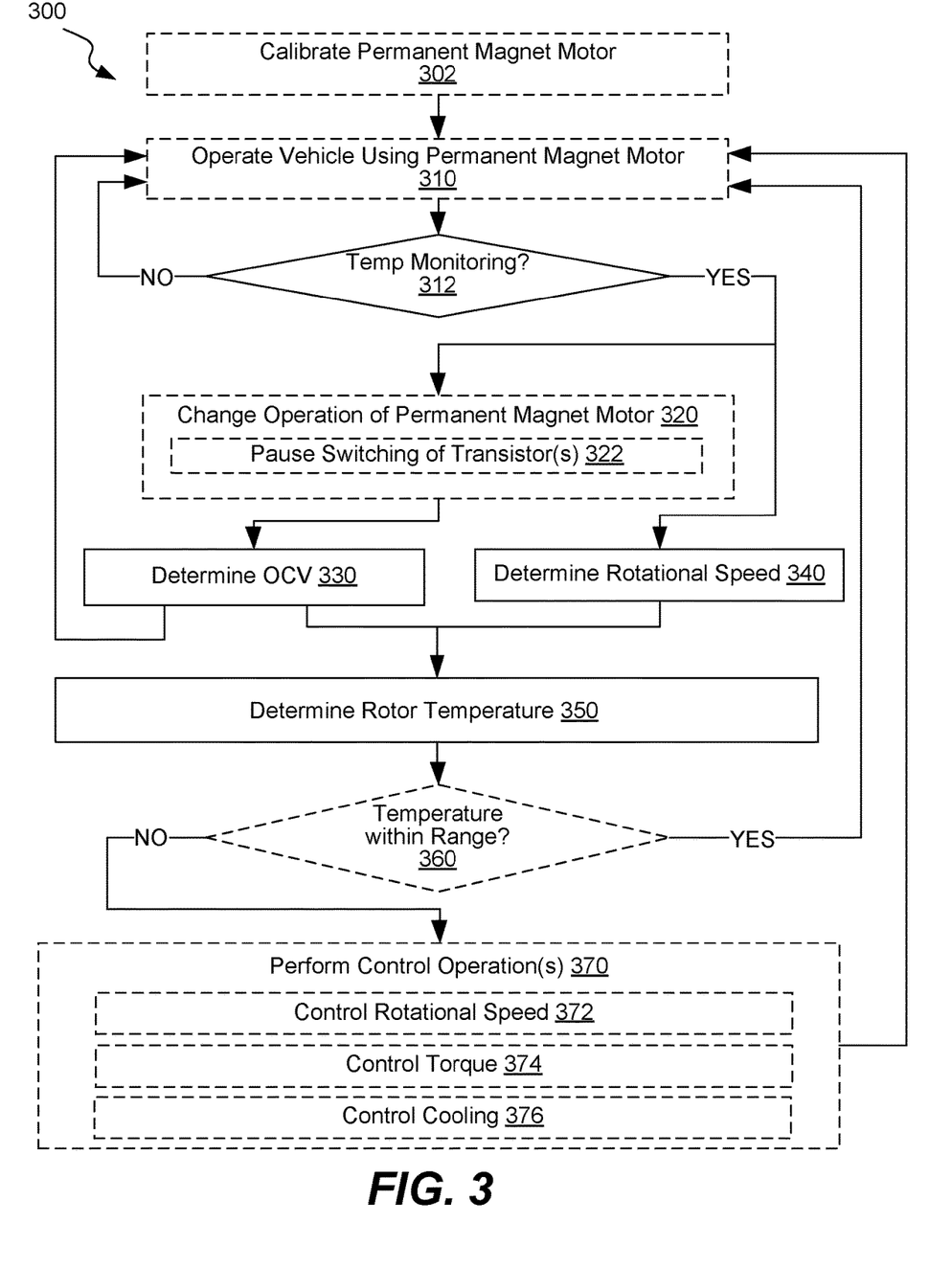
FIG. 3 is a flowchart corresponding to a process for monitoring the magnet temperature of a permanent magnet motor, in accordance with some embodiments.

FIG. 3 is a flowchart corresponding to method 300 for monitoring the magnet temperature of a permanent magnet motor, in accordance with some embodiments. In some embodiments, method 300 comprises calibrating the permanent magnet motor (optional block 302) to determine its temperature-voltage characteristics of this motor. The calibration may be performed, for example, prior to integrating the permanent magnet motor into the drivetrain. Alternatively, the calibration may be performed after integrating the permanent magnet motor into the drivetrain. The calibration operation may involve identifying one or more types of calibration data. For example, the calibration data may comprise at least a calibration temperature, a calibration speed, and a calibration voltage corresponding to the calibration temperature and the calibration speed. In a specific example, the permanent magnet motor may be allowed to reach the temperature of the environment (e.g., a room temperature) at which point, the rotor may be spun (e.g., externally and without applying any power to the permanent magnet motor). The speed of the rotor may be specifically controlled or determined. An open circuit voltage of the motor is determined for this speed. In some embodiments, the calibration data involves multiple data pointes (e.g., voltages at different speeds and different temperatures). In these embodiments, the calibration operation may be repeated for each set of new conditions. Alternatively, these additional calibration points may be calculated based on, for example, linear relationships between the voltage and speed and, separately, between the voltage and temperature, as described above with reference to FIGS. 1A and 1B.

In some embodiments, method 300 comprises operating the vehicle using the permanent magnet motor (optional block 310). During this operation, the rotor temperature of the permanent magnet motor may change, typically increase, due to various electromagnetic and mechanical losses described above. The vehicle may be operated for a period of time without monitoring the rotor temperature as shown by decision block 312. The decision to trigger the temperature monitoring may be based on various factors, such as operating conditions of the permanent magnet motor, previously determined rotor temperature, and the like.

When the decision to monitor the rotor temperature is made, method 300 may proceed with changing operation of the permanent magnet motor (optional block 320). For example, an electrical power may be applied to the permanent magnet motor prior to monitoring the rotor temperature, e.g., as a part of operation 310. In order to measure the open circuit voltage, the power application should be discontinued at least for a brief period of time during the measurement. Specifically, the transistor switching may be paused (optional block 322) for, for example, less than 100 milliseconds.

Alternatively, the permanent magnet motor may be already in a state when the open circuit voltage can be measured and further changes to motor's operation are not needed. In this case, operation 320 is not performed.

Method 300 may procced with determining the open circuit voltage of the permanent magnet motor during operation 330. The open circuit voltage is determined while the rotor of the permanent magnet motor rotates. In some embodiments, determining the open circuit voltage is performed while the vehicle is in motion. Determining the open circuit voltage may be even performed while the permanent magnet motor is mechanically coupled to a wheel of the vehicle while the vehicle is in motion (e.g., while the car is in a driving gear). It should be noted that operation 330 may be performed very quickly (e.g., less than 100 milliseconds) such that the operator does not feel any changes in operation of the vehicle. In reality, the operation may change (e.g., from applying the power to the permanent magnet motor to stop applying the power).

Method 300 may procced with determining the rotational speed of the rotor of the permanent magnet motor during operation 340. The rotational speed used to determine the magnet temperature corresponds to the open circuit voltage. This speed is also used to determine the magnet temperature. In some embodiments, determining the rotational speed may be performed by a speed sensor coupled to a wheel, a gear box, or the permanent magnet motor. For example, the vehicle speedometer and the current gear may be used to determine the rotational speed.

Once the open circuit voltage and the rotational speed are both determined, method 300 may procced with determining the magnet temperature of the permanent magnet motor during operation 350. The magnet temperature is determined based on the open circuit voltage and based the rotational speed. It should be noted that determining the rotational speed may performed simultaneously with determining the open circuit voltage. Alternatively, determining the rotational speed may be performed at a different time frame than determining the open circuit voltage as long as the rotational speed is relatively constant.

This operation 350 may be performed based on calibration data for the permanent magnet motor. The calibration data may comprise at least a calibration temperature, a calibration speed, and a calibration voltage corresponding to the calibration temperature and the calibration speed. For example, operation 350 may involve determining a test voltage corresponding to the rotational speed and determining the magnet temperature corresponding to the open circuit voltage. Determining the test voltage is based on the calibration voltage and a difference between the calibration speed and the rotational speed and. Determining the magnet temperature is based on the calibration temperature and a difference between the test voltage and the open circuit voltage.

In some embodiments, a set of operations comprising determining the open circuit voltage, the determining the rotational speed, and determining the temperature is repeated as shown by the loop starting at decision block 360 or at operation 370. For example, these operations may be repeated at a set frequency. Alternatively, the frequency of determining the temperature may depend on the previously determined temperature and its proximity to a maximum threshold. In some embodiments, the set of operations is repeated after a time period selected from the group consisting of a preset time period, a time period determined based on previous temperature, and a time period determined based on an electrical load of the permanent magnet motor.

In some embodiments, the method further comprises performing at least one controlling operation 370 selected from the group consisting of: controlling the rotational speed of the permanent magnet motor (block 372), controlling torque output of the permanent magnet motor (block 374), and controlling cooling of the of the permanent magnet motor (block 376). This controlling operation may be performed based on the determined magnet temperature (decision block 360). For example, as the determined temperature approaches the maximum threshold, the temperature controlling operation may be selected and implemented.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A method of monitoring a magnet temperature of magnets of a rotor of a permanent magnet motor used for propelling a vehicle, the method comprising:
    determining an open circuit voltage of the permanent magnet motor;
        wherein the open circuit voltage is determined while the rotor of the permanent magnet motor rotates,
    determining a rotational speed of the rotor of the permanent magnet motor,
        the rotational speed corresponding to the open circuit voltage;
    determining the magnet temperature of the magnets on the rotor of the permanent magnet motor based on the open circuit voltage and based the rotational speed; and
    pausing transistor switching in an inverter connected to the permanent magnet motor, wherein the open circuit voltage is determined while the transistor switching is paused.

2. The method of claim 1, wherein determining the open circuit voltage is performed while the vehicle is in motion.

3. The method of claim 1, wherein determining the open circuit voltage is performed while the permanent magnet motor is mechanically coupled to a wheel of the vehicle while the vehicle is in motion.

4. The method of claim 1, further comprising operating the vehicle using the permanent magnet motor, wherein operating the vehicle is changed while determining the open circuit voltage of the permanent magnet motor and reinstated after the open circuit voltage is determined.

5. The method of claim 1, wherein pausing the transistor switching is performed for less than 100 milliseconds.

6. The method of claim 1, wherein determining the rotational speed is performed simultaneously with determining the open circuit voltage.

7. The method of claim 1, wherein determining the rotational speed is performed by a sensor coupled to one of selected from the group consisting of a wheel, a gear box, and the permanent magnet motor.

8. The method of claim 1, wherein a set of operations comprising determining the open circuit voltage, determining the rotational speed, and determining the magnet temperature is repeated while the vehicle is in motion.

9. The method of claim 8, wherein the set of operations is repeated after a time period selected from the group consisting of a preset time period, a time period determined based on a previously determined magnet temperature, and a time period determined based on an electrical load of the permanent magnet motor.

10. The method of claim 1, further comprising performing at least one controlling operation selected from the group consisting of:
    controlling the rotational speed of the permanent magnet motor,
    controlling torque output of the permanent magnet motor, and
    controlling cooling of the of the permanent magnet motor,
    wherein the at least one controlling operation is performed based on the determined magnet temperature.

11. A method of monitoring a magnet temperature of magnets of a rotor of a permanent magnet motor used for propelling a vehicle, the method comprising:
    determining an open circuit voltage of the permanent magnet motor;
        wherein the open circuit voltage is determined while the rotor of the permanent magnet motor rotates,
    determining a rotational speed of the rotor of the permanent magnet motor,
        the rotational speed corresponding to the open circuit voltage; and
    determining the magnet temperature of the magnets on the rotor of the permanent magnet motor based on the open circuit voltage and based the rotational speed, wherein determining the magnet temperature is performed from calibration data for the permanent magnet motor, the calibration data comprising at least a calibration temperature, a calibration speed, and a calibration voltage corresponding to the calibration temperature and the calibration speed.

12. The method of claim 11, wherein determining the magnet temperature comprises:
    determining a test voltage corresponding to the rotational speed,
        wherein determining the test voltage is based on the calibration voltage and a difference between the calibration speed and the rotational speed and; and
    determining the magnet temperature corresponding to the open circuit voltage,
        wherein determining the magnet temperature is based on the calibration temperature and a difference between the test voltage and the open circuit voltage.

13. The method of claim 11, further comprising calibrating the permanent magnet motor at the calibration temperature and the calibration speed to determine the calibration voltage.

14. The method of claim 13, wherein calibrating the permanent magnet motor is performed prior to integrating the permanent magnet motor into a drivetrain.

15. A vehicle drivetrain comprising:
    a permanent magnet motor comprising a rotor, the rotor comprising permanent magnets;
    an inverter electrically coupled to the permanent magnet motor and controlling electrical power applied to the permanent magnet motor and operable to determine an open circuit voltage of the permanent magnet motor;
    a sensor for determining a rotational speed of the rotor of the permanent magnet motor; and
    a controller communicatively coupled to the inverter and to the sensor,
        wherein the controller is operable to determine a magnet temperature of the permanent magnets from the open circuit voltage and the rotational speed, and
        wherein the controller comprises calibration data for the permanent magnet motor, the calibration data comprising at least a calibration temperature, a calibration speed, and a calibration voltage corresponding to the calibration temperature and the calibration speed.

16. The vehicle drivetrain of claim 15, further comprises a cooling system thermally coupled to the permanent magnet motor and controlled by the controller.

17. The vehicle drivetrain of claim 15, wherein the inverter comprises one or more transistors controlled by the controller while determining the open circuit voltage.

18. The vehicle drivetrain of claim 15, further comprising a power source electrically coupled to the inverter, wherein the inverter is operable to control power supplied by the power source to the permanent magnet motor while determining the open circuit voltage.

19. The vehicle drivetrain of claim 15, wherein the permanent magnet motor is calibrated at the calibration temperature and the calibration speed to determine the calibration voltage.

20. The vehicle drivetrain of claim 15, wherein the controller is operable to:
    determine a test voltage corresponding to the rotational speed, wherein the test voltage is determined based on the calibration voltage and a difference between the calibration speed and the rotational speed and; and
    determine the magnet temperature corresponding to the open circuit voltage, wherein the magnet temperature is determined based on the calibration temperature and a difference between the test voltage and the open circuit voltage.

* * * * *